United States Patent [19]
Richards

[11] B 3,999,741
[45] Dec. 28, 1976

[54] BULK CONTAINER UNLOADING APPARATUS

[75] Inventor: Joseph A. Richards, Wilmington, Del.

[73] Assignee: E. I. Du Pont de Nemours and Company, Wilmington, Del.

[22] Filed: Feb. 4, 1975

[21] Appl. No.: 547,016

[44] Published under the second Trial Voluntary Protest Program on March 23, 1976 as document No. B 547,016.

Related U.S. Application Data

[63] Continuation-in-part of Ser. No. 306,922, Nov. 15, 1972, abandoned.

[52] U.S. Cl. ................................. 259/8; 214/310
[51] Int. Cl.² .......................................... B01F 7/18
[58] Field of Search .................. 259/5, 6, 7, 8, 21, 259/22, 23, 24, 41, 42, 43, 44, 66, 67, 95, 108, 107; 214/310

[56] References Cited
UNITED STATES PATENTS

| | | | |
|---|---|---|---|
| 1,552,905 | 9/1925 | Zimmermann | 259/8 |
| 2,801,083 | 7/1957 | Balassa | 259/8 |
| 3,057,519 | 10/1962 | Platt | 222/195 |
| 3,421,741 | 1/1969 | Baechler | 259/108 |
| 3,451,724 | 6/1969 | Cappelli | 259/95 X |

*Primary Examiner*—Robert W. Jenkins

[57] ABSTRACT

A bulk container unloading apparatus is described which is especially useful for handling pigments. While in the transportable container, the contents are mixed with liquid supplied through a hollow-shafted mixer and thereafter the resultant dispersion is withdrawn in the same way.

2 Claims, 2 Drawing Figures

BULK CONTAINER UNLOADING APPARATUS

CROSS-REFERENCE TO RELATED APPLICATION

This application is a continuation-in-part of application Ser. No. 306,922, filed Nov. 15, 1972, now abandoned.

BACKGROUND OF THE INVENTION

In the manufacture of pigments it is frequently the case that moisture-laden cakes of particulate solids are recovered in a final stage, e.g., from a filter device, and then must be shipped over a substantial distance. Such shipping might be made to another processing facility where pigment blends would be produced or to a consumer who would utilize the pigment in dispersion form for manufacturing paper, coatings or other products.

In any case, there is a considerable economic advantage to shipping such pigments in solids form in a bulk container provided, however, that later the pigment can be readily removed from the container by a mechanical operation without spillage or other loss and at a concentration useable in the process.

SUMMARY OF THE INVENTION

In accordance with the invention there is provided a material handling apparatus for unloading liquid-dispersible particulate material from a transportable container. The container has a relatively large centrally located port in the top for loading the particulate material therein and a smaller centrally located recess in the bottom to facilitate removal of the particulate material in slurry form. The apparatus utilizes a hollow mixing shaft which is mounted for rotation about a vertical axis, is open at its lower end, has at least one radially projecting mixing blade affixed thereto, and is of a length approximating the container height so that it can penetrate nearly to the bottom of the container. Means are provided for raising and lowering the container between a lowered position in which the container is disposed with its top below the lower end of the mixing shaft and a raised mixing position wherein the lower end of the mixing shaft is positioned in the container adjacent the recess in the bottom of the container. Measured amounts of liquid can thus be introduced to the container through the shaft during agitation, a slurry thereby formed, and then the slurry withdrawn through the shaft for storage or other use.

Figure 1:
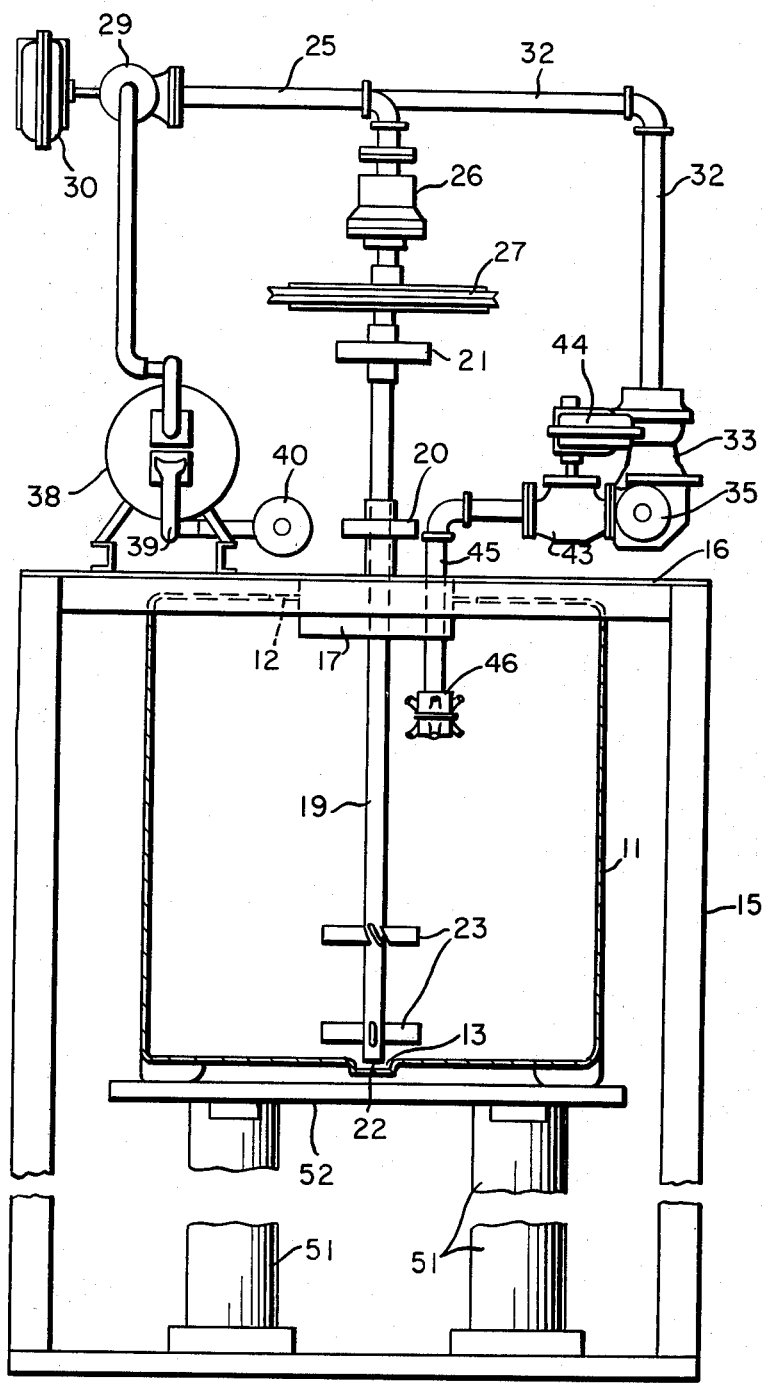
FIG. 1 shows a front elevational view of the apparatus of the invention in partial cross-section.
Figure 2:
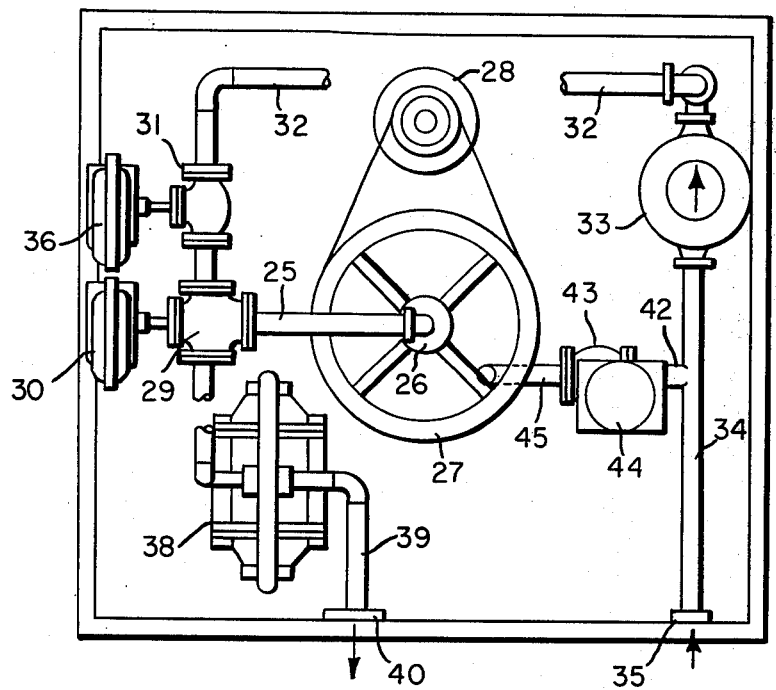
FIG. 2 shows a plan view of the apparatus of FIG. 1 from overhead.

Referring to the Figures, there is provided a generally cubical-shaped transportable container 11 having a relatively large centrally located circular port 12 on top for loading of particulate material into the container and a smaller centrally located circular depression 13 on the bottom to assist in fully draining the container. A frame formed of four angle iron columns 15 secured to each corner of steel plate 16 serves as a support for certain portions of the apparatus. As a splash guard annular rim 17 is affixed to the underside of plate 16 so that when the container is in the raised position, as shown in FIG. 1, rim 17 projects into port 12 to prevent spillage during operation. A hollow mixing shaft 19 passes through plate 16 and rim 17, being journaled in pillow blocks 20, 21 which are attached to a vertical extension (not shown) of plate 16.

The bottom end 22 of hollow shaft 19 is open and extends into or just slightly above the depression 13 when the container 11 is in the fully raised position as shown in FIG. 1. Mixing blades 23 radially project from the shaft, and at least one series of these is located near shaft end 22. The top end of the hollow shaft 19 connects to a flexible conduit 25 through a rotating union 26. The hollow shaft 19 is driven through a V-belt and pulley assempy 27 by a motor 28.

The flexible pipe 25 leading from hollow shaft 19 connects to a three-way plug valve 29, which is operated by motor 30. One arm of valve 29 is connected through a two-way plug valve 31 which is operated by motor 36, and then through line 32, liquid meter 33, and line 34 to an outside source of water or other liquid connected at flange 35. A metered amount of liquid can thus be charged to container 11 by way of the hollow shaft 19 while agitation is proceeding.

The other arm of the three-way valve 29 is connected to diaphragm pump 38 which operates to withdraw slurry from container 11 through the hollow shaft 19, and via lines 25, 39 to an outside line or storage tank connected at flange 40.

A branch 42 of the liquid inlet line 34 leads to two-way plug valve 43, operated by motor 44, and thence through line 45 to a spray head 46 by which means the container can be washed after the slurried solids are discharged.

The raising and lowering of container 11 is effected by means of hydraulically operated cylinders 51 whose piston rods, not shown, are operatively connected to platform 52.

In operation, a circular cover (not shown) is removed from the port 12 in the top of standard bulk container 11. The container is about ⅔ filled with pigment cake recovered from a filter in the course of a final stage of pigment manufacture. The container is positioned in the frame opening, e.g., by means of a fork lift truck, so that hollow shaft 19 is centered directly above port 12. At the start, valve 43 is closed, valve 31 is open and the plug of the three-way valve 29 is oriented such that the liquid inlet line 34 opens to lines 32, 25 and the hollow shaft 19. The hydraulic lift is actuated and while the container is being raised to the position shown, rotation of the hollow shaft 19 and pumping of liquid to the container are commenced at a preselected elevation, preferably where contact first occurs between the shaft and solids. With the container at maximum elevation and with the required amount of slurrying liquid having been pumped to the container, as determined by liquid meter 33, agitation is continued until slurrying is complete. The three-way valve 29 is then activated to connect the hollow shaft with the diaphragm pump 38 and the slurry is pumped from the container while mixing continues.

After discharge of the slurry is complete, valve 43 is opened and water or other wash liquid is pumped to the container through the spray head 46 while agitation continues. The wash liquid containing solids is then pumped to storage or to disposal facilities, again by means of pump 38. More than one short wash cycle may be advantageous. After washing, the bulk container is lowered and removed.

The unloading cycle may be manually controlled by an operator or automatically controlled by a sequential programmer, a number of which are commercially available.

The device of the invention is highly efficient in terms of the extent to which moist, pigment solids, which are often somewhat gummy in character, are uniformly dispersed and then drained cleanly from the container with little or no adherence of material to the inner walls. To a considerable extent the walls of the container, which act much like baffles during agitation, and the recess in the bottom of the container, markedly contribute to the overall efficiency of the apparatus.

What is claimed is:

1. Material handling apparatus for unloading liquid-dispersible particulate material comprising
   a generally cubical-shaped transportable container having a relatively large centrally located port in the top thereof and a smaller centrally located recess in the bottom thereof,
   a frame defining an opening adapted to receive said container,
   a hollow mixing shaft supported for rotation about a vertical axis by said frame and extending into said opening, said mixing shaft being open at its lower end and being of a length approximating the container height, said mixing shaft having at least one radially projecting mixing blade affixed thereto, one mixing blade being located near the lower end of said hollow mixing shaft and being affixed to said hollow mixing shaft so that the edges of said blade remote from said shaft are parallel to said shaft and perpendicular to said container,
   drive means for rotating said mixing shaft,
   lift support means for supporting the container within said opening and for raising and lowering the container between a lowered position in which the container is disposed with its top below the lower end of the mixing shaft and a raised mixing position wherein the lower end of the mixing shaft is positioned in the container adjacent to said recess,
   pump means, and
   a conduit connecting said pump means and the upper end of said mixing shaft for introduction of liquid into the container and for withdrawal of a dispersion therefrom.

2. Apparatus according to claim 1 comprising in addition at least one radially projecting mixing blade affixed to said hollow mixing shaft so that the edges of said blade remote from said shaft form an acute angle with respect to said hollow mixing shaft and located on said shaft between the mixing blade located near the lower end of said hollow mixing shaft and the upper end of said hollow mixing shaft extending into the opening defined by said frame.

* * * * *